Patented Aug. 26, 1941

2,253,722

UNITED STATES PATENT OFFICE 2,253,722

LIQUID TREATING COMPOSITION AND METHOD OF MAKING SAME

Bruno Montero, Los Angeles, Calif., assignor to Investo Company, Incorporated, Los Angeles, Calif.

No Drawing. Application April 22, 1940, Serial No. 330,992

10 Claims. (Cl. 23—113)

This invention relates to a chemical composition of matter for treating liquids and the method of making same. This composition not only removes lime from water but also separates therefrom the magnesium it may contain.

The present application is a continuation in part of my earlier application entitled "Water softening composition and method of making same," Serial No. 154,395, filed July 19, 1937; and of my application entitled "Fluid treating composition and method of making same," Serial No. 301,633, filed October 27, 1939, now Patent No. 2,213,530.

The invention pertains to a composition of a granular character which does not dissolve in water but has the property of attracting the molecules of calcium and magnesium from the body of water brought into contact therewith.

This product is an industrial product. The materials used are obtainable on the market in large amounts and at a low cost.

Furthermore, as all products used are standard, if preferred, all proportions may be estimated by volume and not by weight, and all operations performed at ordinary temperatures without artificially heating or cooling. Also, as this product is industrial and not a "drug," such small variations as might occur in particle size and amount of packing, etc., do not materially alter the quality of the final product.

The filtering material provided by this invention acts effectively in filtering and bleaching both vegetable and mineral oils. It can also be used, by filtration, to remove various impurities from acids.

It is an important object of the invention to provide for more rapid and economical production of an efficient water softening composition of matter, by avoiding the necessity of taking the time hitherto required to dry water softening compositions before they are in condition for use. Although water softening compositions in some respects similar to that to which this invention pertains have hitherto been produced, it has, thus far, been found necessary to dry them slowly thereby converting them from jellies of the kind that cannot be broken up into granules which maintain their separate character during use, into sufficiently dry, granular products to be usable as filtering substances and to soften water. This invention provides for the more rapid and economical manufacture of the composition owing to it being ready for use immediately after the ingredients thereof have been combined with each other. The relative amount of water required to make this composition is very small.

Another object of the invention is to produce a water softening and liquid filtering product which sulphuric, hydrochloric and carbonic acids will not injure.

The following are the steps to be followed, and quantities by avoirdupois weight (except the water, which is measured) of the ingredients used in making the composition of matter to which this invention pertains:

In carrying out the invention I have found that best results are secured by dissolving from one to one and one-half ounces (avoirdupois) technical aluminum sulfate, which is the ordinary, undehydrated, granular, commercial aluminum sulfate preferably having the formula $Al_2(SO_4)_3.18H_2O$ together with from 150 to 222 grains (avoirdupois) of an indurative agent, preferably chloride of sodium in sufficient water to form a saturated solution; this will require from one to three liquid ounces of water, depending upon the quantity of aluminum sulfate employed. Sodium silicate consisting of $Na_2O$ 8.85%, $SiO_2$ 28.5%, $H_2O$ 62.65%, in an amount which may range from about two to six ounces (avoirdupois), is then added to the solution, which coagulates and precipitates a mass of insoluble grains clustered together in a lumpy mass. The mass is then subjected to washing and mechanical treatment to separate the grains and form them to a desired size, giving the final product.

While chloride of sodium is at present deemed to be the best indurative ingredient for use in producing the product, yet other indurative ingredients, such as sodium sulfate $$(Na_2SO_4.10H_2O)$$

may be substituted in some cases, if desired.

It will be understood that for larger or smaller batches the same ratios of ingredients prevail. A preferred manner of practicing the invention is as follows:

In two fluid ounces of water (any water suitable for domestic use) dissolve one ounce and 72 grains of ordinary undehydrated, granular commercial aluminum sulfate, preferably having the formula $Al_2(SO_4)_3.18H_2O$; and 175 grains of sodium chloride (NaCl), preferably in a finely granular condition (dairy salt). Into the liquid solution thus produced pour five ounces and 335 grains of sodium silicate, forty degrees Baumé density, and consisting of $Na_2O$ 8.85%, $SiO_2$ 28.5%, $H_2O$ 62.65%. By stirring in well this last ingredient an immediate coagulation is caused to take place, and there is at once produced a uniform product consisting of a granular precipitate of insoluble grains wherein the grains cluster together in a lumpy mass, a small quantity of liquid that can be decanted off remaining. After decanting off said liquid the granular part is washed by pouring water thereonto, stirring and decanting. Or a vat having a bottom outlet covered by a fine mesh sieve may be used for this flushing with water and draining off operation. When the ingredients have been properly mixed, one complete washing will suffice.

While it is not commercially practicable to put a very small proportional amount of the sodium silicate (having the formula which has been stated) into the aluminum sulfate solution set forth, yet even if, for example, one ounce only of said sodium silicate be immersed in the maximum chloride of sodium and aluminum sulfate solution stated in the preceding paragraph, the product will still be a useful composition of matter for the purpose stated.

The product may be washed in water either before or after it is reduced to granules by passing it through a sieve or by using any other suitable means to reduce it to granules of the desired size.

The first effect of applying cleansing water to the product is to clean the larger and unbroken portions of the product.

After the product has thus been washed it is passed through a sieve, desirably of a twenty (20) mesh, this being preferably done while the sieve and the product supported thereby are maintained submerged under water. The size of the grains thus produced will be determined by the size of the meshes of the sieve through which the product is passed. The grains thus produced are of a highly porous character, are insoluble in water, and are of a very desirable quality for water filtering and softening. The quick formation of a uniform product is believed to be due to the fact that into a more highly concentrated aluminum sulfate solution than has been hitherto used for a similar purpose is poured and quickly mixed the sodium silicate. The mixing operation is continued until a uniform hardness of the grains is produced. When, for example a pound (avoirdupois) or less of the ingredients are mixed together the mixing operation can be completed within at least five minutes. Actual tests have shown that this product can be used for many months under usual domestic city water pressure without any lessening of its efficiency or diminishing of its volume, for water filtering and purifying.

By the granular condition of the precipitate specified in the appended claims is meant a condition wherein the product is reduced to particles the cross-sectional dimensions of which are restricted to a size that will adapt it for use in a body of material through which the liquid to be treated is caused to percolate, said granules being of a non-sticky and a non-slimy character so that they do not adhere to each other but which, when formed into a filtering body and as such subjected to ordinary city water pressure for many months will still afford interstices between them through which the water being filtered may percolate. When a large body of the product is used for industrial purposes or, for example, in using large containers or reservoirs to filter a city water supply, the granulating step may be omitted, thereby lessening the cost of the manufacture of the product.

The product is of a lumpy character when ready for being granulated, the size of lumps formed depending upon the vigor and extent of the stirring operation, and also upon the kind of stirring means used.

The size of the granules into which the product will be broken up by passing it through a sieve, or otherwise, will be determined by the kind of fluid to be treated. It is desirable to use small granules, where practicable, because the smaller the granules the greater the surface area presented to the fluid being treated.

The product produced by this process cannot be destroyed by sulphuric, hydrochloric or carbonic acids in any degree of concentration. For example, this product can be immersed in a solution of fifty per cent water and fifty per cent of sulphuric acid ($SO_4H_2$) for many hours without disqualifying said product for water softening and filtering purposes.

After the product has been washed with sufficient thoroughness to insure that all the larger particles have been properly cleaned, it may be further treated in an alkaline solution such as sodium carbonate ($Na_2CO_3.10H_2O$) to provide the desired hardness of the product. Additional washing may be found desirable to remove small particles of the product and thereby prevent undesirable close packing of the product in a filter bed, which may take place when a powdered residue is contained in the product. The repeated and thorough washing of the product clears it up so that it becomes more active in its base exchange action.

I claim:

1. The method of making an artificial base exchanging composition of matter which consists in dissolving in sufficient water to produce a saturated solution a quantity of aluminum sulfate ($Al_2(SO_4)_3.18H_2O$) between one and one and one-half ounces (avoirdupois); adding to this solution between 150 and 222 grains of chloride of sodium (NaCl); and then mixing into the resulting solution between three and six ounces (avoirdupois) of sodium silicate, forty degrees Baumé, consisting of $Na_2O$ 8.85%, $SiO_2$ 28.5%, $H_2O$ 62.65%.

2. The subject matter of claim 1 and, then reducing the resulting precipitate without drying into a granular condition.

3. The subject matter of claim 1 and, then reducing the resulting precipitate without drying into a granular condition by passing it through a sieve.

4. The subject matter of claim 1 and, then reducing the resulting precipitate without drying into a granular condition by pasing it while submerged in water through a reducing means to form granules of the desired size.

5. In the manufacture of base exchange silicates embodying sodium silicate and aluminum sulfate, the process of procuring direct granulation without gelation or drying, which comprises adding the sodium silicate to a prepared saturated solution of aluminum sulfate and sodium choride in water, whereby immediate coagulation is obtained with precipitation of the final product as a conglomerate mass of easily separable, hard particles.

6. In the manufacture of base exchange silicates embodying sodium silicate and aluminum sulfate, the process of procuring direct granulation without gelation or drying, which comprises adding the sodium silicate to a saturated solution of aluminum sulfate and an indurative ingredient in water, whereby immediate coagulation is obtained with precipitation of the final product as a conglomerate mass of easily separable, firm granules.

7. The method of making an artificial base exchanging composition of matter which consists in dissolving in sufficient water to produce a saturated solution a quantity of aluminum sulfate ($Al_2(SO_4)_3.18H_2O$) between one and one and one-half ounces (avoirdupois); adding to this solution between 150 and 222 grains of chloride of sodium (NaCl); and then mixing into the resulting solution between three and six ounces (avoirdupois) of sodium silicate, forty degrees Baumé, consisting of $Na_2O$ 8.85%, $SiO_2$ 28.5%, $H_2O$ 62.65%, said mixing being performed by a stirring operation whereby lumps of a predetermined size are produced in the product.

8. The subject matter of claim 7 and, then washing said lumpy product in commercially pure water to remove all soluble substances including excess of the aluminum sulfate and of the sodium chloride.

9. The subject matter of claim 7 and, then washing said lumpy product in commercially pure water to remove all soluble substances including excess of the aluminum sulfate and of the sodium chloride; then reducing the product to a granular condition, then again washing it in commercially pure water to remove any undesired residue.

10. The method of making an artificial base exchanging composition of matter which consists in dissolving in sufficient water to produce a saturated solution a quantity of aluminum sulfate ($Al_2(SO_4)_3.18H_2O$) between one and one and one-half ounces (avoirdupois); adding to this solution between 150 and 222 grains of chloride of sodium (NaCl); and then mixing into the resulting solution between one and six ounces (avoirdupois) of sodium silicate, forty degrees Baumé, consisting of $Na_2O$ 8.85%, $SiO_2$ 28.5%, $H_2O$ 62.65%.

BRUNO MONTERO.